US012791781B2

(12) United States Patent
Schultz

(10) Patent No.: US 12,791,781 B2
(45) Date of Patent: Nov. 10, 2026

(54) DOUBLE-SIDED WAVEGUIDE

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 427 days.

(21) Appl. No.: 18/686,372

(22) PCT Filed: Aug. 23, 2022

(86) PCT No.: PCT/US2022/041284
§ 371 (c)(1),
(2) Date: Feb. 23, 2024

(87) PCT Pub. No.: WO2023/028093
PCT Pub. Date: Mar. 2, 2023

(65) Prior Publication Data

US 2024/0385364 A1 Nov. 21, 2024

Related U.S. Application Data

(60) Provisional application No. 63/236,196, filed on Aug. 23, 2021.

(51) Int. Cl.
*F21V 8/00* (2006.01)

(52) U.S. Cl.
CPC ......... *G02B 6/0063* (2013.01); *G02B 6/0036* (2013.01)

(58) Field of Classification Search
CPC .. G02B 6/0016; G02B 6/0018; G02B 6/0036; G02B 6/0038; G02B 6/006;
(Continued)

(56) References Cited

U.S. PATENT DOCUMENTS 9,250,373 B2 * 2/2016 Kubota .................. G02B 27/44
9,989,763 B2 * 6/2018 Woltman ........... G02B 27/4205
(Continued)

FOREIGN PATENT DOCUMENTS

CN 107167920 A 9/2017
JP 2019507366 A 3/2019
(Continued)

OTHER PUBLICATIONS

Dongwei et al. (2021), "Design of diffractive waveguide near eye display system with exit pupil expansion," Proc. SPIE 120630A.

*Primary Examiner* — Robert Tavlykaev
(74) *Attorney, Agent, or Firm* — Harter Secrest & Emery LLP; Jacob D. Merrill, Esq.

(57) ABSTRACT

An imaging light guide for conveying a virtual image comprises a first planar waveguide. The first planar waveguide includes first and second co-located in-coupling diffractive optics, each comprising a plurality of periodic diffractive structures, wherein the first in-coupling diffractive optic is operable to diffract a first portion of image-bearing light beams into the first planar waveguide in an angularly encoded form, wherein the first in-coupling diffractive optic is operable to transmit a second portion of image-bearing light beams, a first out-coupling diffractive optic formed along the waveguide, wherein the first out-coupling diffractive optic is operable to expand the first portion of the image-bearing light beams and direct the expanded first portion of image-bearing light beams from the waveguide in an angularly decoded form, and wherein the plurality of diffractive structures of the second in-coupling optic have a periodicity different from the plurality of periodic diffractive structures of the first in-coupling diffractive optic.

20 Claims, 11 Drawing Sheets

(58) Field of Classification Search
CPC ........ G02B 27/0081; G02B 2027/0125; G02B 2027/0178; G02B 2027/0172
USPC ............................ 385/37, 129; 359/630, 634
See application file for complete search history.

(56) References Cited

U.S. PATENT DOCUMENTS

| | | | | |
|---|---|---|---|---|
| 10,359,635 | B2 * | 7/2019 | Grey | G02B 27/0081 |
| 11,061,231 | B2 | 7/2021 | Takashi et al. | |
| 11,953,685 | B2 * | 4/2024 | Alexeev | G02B 27/4272 |
| 12,147,038 | B2 * | 11/2024 | Oh | G02B 5/1814 |
| 2007/0188837 | A1 * | 8/2007 | Shimizu | G02B 27/0172 359/13 |
| 2014/0043846 | A1 | 2/2014 | Yang et al. | |
| 2016/0116739 | A1 * | 4/2016 | TeKolste | G02B 6/005 |
| 2016/0124223 | A1 * | 5/2016 | Shinbo | G02B 27/0101 385/37 |
| 2017/0102543 | A1 * | 4/2017 | Vallius | G06T 19/006 |
| 2017/0315346 | A1 | 11/2017 | Tervo et al. | |
| 2018/0275410 | A1 | 9/2018 | Yeoh et al. | |
| 2020/0209630 | A1 | 7/2020 | Schultz et al. | |
| 2020/0264378 | A1 | 8/2020 | Grant et al. | |
| 2020/0278543 | A1 | 9/2020 | Schultz et al. | |
| 2020/0400955 | A1 | 12/2020 | Messer et al. | |
| 2021/0199958 | A1 | 7/2021 | Huang et al. | |
| 2021/0231854 | A1 | 7/2021 | Schultz et al. | |
| 2022/0146831 | A1 | 5/2022 | Deng | |
| 2022/0214503 | A1 * | 7/2022 | Waldern | G02B 6/34 |

FOREIGN PATENT DOCUMENTS

| | | | |
|---|---|---|---|
| JP | 2019510251 | A | 4/2019 |
| JP | 2020523634 | A | 8/2020 |
| WO | 2016084831 | A1 | 6/2016 |
| WO | 2017120334 | A1 | 7/2017 |
| WO | 2017120341 | A1 | 7/2017 |
| WO | 2018231754 | A1 | 12/2018 |
| WO | 2021080734 | A1 | 4/2021 |
| WO | 2021137996 | A1 | 7/2021 |

* cited by examiner

DOUBLE-SIDED WAVEGUIDE

TECHNICAL FIELD

The present disclosure generally relates to electronic displays and more particularly relates to head-mounted near-eye displays that use image light guides with diffractive optics to convey image-bearing light beams to a viewer.

BACKGROUND

Head-Mounted Displays (HMDs), which can take the binocular form of eyeglasses or the monocular form of suspended eyepieces, can include an image source and an image light guide for presenting virtual images to a wearer's eyes. The image light guides can be arranged with an in-coupling optic and an out-coupling optic incorporated into a transparent waveguide for conveying the virtual images in an angularly encoded form from an offset position of the image source to a position aligned with the wearer's eye. The transparent waveguide can also provide an aperture through which the wearer can simultaneously view the real world, particularly in support of augmented reality (AR) applications in which the virtual images are superimposed on the real-world scene. For many applications, there is particular value in forming a virtual image that can be visually superimposed over the real-world image that lies in the field of view of the HMD user.

The image source can take several forms including back-lit, front-lit, or light generating displays combined with focusing optics for converting spatial information into substantially collimated angularly related beams. Alternatively, the image source can be arranged as a beam scanning device to angularly direct light from a source of substantially collimated light. The two dimensions of the images can also be separately generated such as by a combination of a linear display with a beam scanning device.

In conventional image light guides, collimated, relatively angularly encoded light beams from an image source are coupled into a planar waveguide by an in-coupling optic, which can also take a variety of forms including prisms, mirrors, or diffractive optics, directs the angularly related beams from the image source into the waveguide. For example, such diffractive optics can be formed as diffraction gratings or holographic optical elements that can be mounted on the front or back surface of the planar waveguide or formed in the waveguide. For example, the diffraction grating can be formed by surface relief. A portion of an input beam after coupling into the waveguide is sometimes referred to herein as an "in-coupled ray."

After propagating along the waveguide, the diffracted light can be directed out of the waveguide by an out-coupling optic such as an out-coupling diffractive optic, which can be arranged to provide pupil expansion in one or more directions. To preserve a view of the ambient environment through the waveguide, the out-coupling optic should avoid distorting or otherwise impairing the wearer's view of the real world. As a diffractive optic, the out-coupling optic can be matched with the in-coupling diffractive optic to decode any angular encoding imposed by the in-coupling diffractive optic. In addition, the efficiency of the out-coupling diffractive optic can be controlled to support multiple encounters with the angularly related beams propagating along the waveguide to effectively enlarge each beam so that beams diffracted from the waveguide overlap over a larger area within which the virtual image can be seen by the wearer's eye.

Each of the image bearing light paths, or channels, may convey different information about the image, such as an angular relationship and/or color properties. Diffractive optics forming an optical path for image-bearing light beams of each primary color red (R), green (G), blue (B) may require different properties for optimal performance of each color. Although conventional light guide mechanisms have provided a significant reduction in bulk, weight, and overall cost of display optics, there are still issues to resolve. In a double-sided single plate waveguide, crosstalk is typically encountered. Unlike most optical systems, waveguides do not have a fixed effective input aperture. Generally, the effective input aperture will be dependent on at least the thickness of the planar waveguide. If the in-coupled ray is reflected back (i.e., bounces by total internal reflection) onto an in-coupling diffractive optic, the in-coupled ray tends to out-couple resulting in a reduced quantity (i.e., intensity) of image-bearing light input to the image-light guide propagating through the waveguide. Because each beam, considered as a bundle of collimated rays of image-bearing light that correspond to a single point in a virtual image, or field angle, in-couples at different angles, each field angle has a different effective aperture. Thus, adding a second in-coupling diffractive optic to the second surface of a waveguide can reduce, by up to half, the effective input aperture. Rotating the diffractive features of the second in-coupling diffractive optic so that the in-coupled light from the second in-coupling diffractive optic propagates in a different direction than the light in-coupled by the first in-coupling diffractive optic (on the first surface of the waveguide) is known. However, improved separation of wavelength range light paths is needed in order to reduce crosstalk, in which color is processed and displayed from the wrong wavelength range light path. Crosstalk can lead to disparities between the color image data and the displayed color, and can also be a cause of objectionable color shifts, perceptible across the image field. Thus, it can be appreciated that there is a need for improved designs that still provide the pupil expansion capabilities of the imaging light guide, but allow these devices to be thinner and more lightweight, without comprising image quality and color balance.

SUMMARY

Embodiments of the present disclosure provide a waveguide providing at least two wavelength range light paths within a single thickness of substrate while reducing crosstalk.

According to an aspect of the present disclosure, there is provided an imaging light guide for conveying a virtual image, comprising, a first planar waveguide operable to propagate image-bearing light beams, the first planar waveguide having a first and second parallel surfaces, a first in-coupling diffractive optic formed along or in the first surface, the first in-coupling diffractive optic comprising a first plurality of periodic diffractive structures, wherein the first in-coupling diffractive optic is operable to diffract a first portion of the image-bearing light beams into the first planar waveguide in an angularly encoded form, and wherein the first in-coupling diffractive optic is operable to transmit a second portion of the image-bearing light beams, a first out-coupling diffractive optic formed along the waveguide, wherein the first out-coupling diffractive optic is operable to replicated the first portion of the image-bearing light beams and direct the replicated first portion of image-bearing light beams from the waveguide in an angularly decoded form, a second in-coupling diffractive optic formed along or in the second surface, wherein the second in-coupling diffractive optic is operable to diffract the second portion of the input image-bearing light beams into the first planar waveguide in an angularly encoded form, wherein the second in-coupling diffractive optic comprises a second plurality of periodic diffractive structures having a periodicity different from the first plurality of periodic diffractive structures of the first in-coupling diffractive optic, wherein the first in-coupling diffractive optic is substantially co-located with the second in-coupling diffractive optic, a first intermediate diffractive optic operable to direct the first portion of the image-bearing light beams to the first out-coupling optic and located along the first planar surface, second intermediate diffractive optic operable to direct the second portion of the image-bearing light beams to the first out-coupling diffractive optic and located on the second planar surface, wherein the first intermediate diffractive optic is offset with respect to the second intermediate diffractive optic, whereby interaction between the first portion of the image-bearing light beams and the second in-coupling diffractive optic and the second intermediate diffractive optic is reduced and interaction between the second portion of the image-bearing light beams and the first in-coupling diffractive optic and the first intermediate diffractive optic is reduced, and wherein the first portion of the image-bearing light beams comprises a first wavelength range and the second portion of the image-bearing light beams comprises a second wavelength range.

In certain embodiments, the first portion of the image-bearing light beams comprises a first wavelength range and the second portion of the image-bearing light beams comprises a second wavelength range. In other embodiments, the first portion of image-bearing light beams comprises a first range of angularly related beams and the second portion of image-bearing light beams comprises a second range of angularly related beams that differs from the first range of angularly related beams.

The first planar waveguide can include a second out-coupling diffractive optic in alignment with the first out-coupling diffractive optic on the second surface. In one exemplary embodiment, the first and second out-coupling diffractive optics have the same periodic diffractive features. In a further exemplary embodiment, the first and second out-coupling diffractive optics include two-dimensional periodic diffractive features operable to replicate the first portion and the second portion of the image-bearing light beams and direct the replicated image-bearing light beams from the waveguide in an angularly decoded form.

In certain embodiments, each of the periodic diffractive features of the first and second out-coupling diffractive optics have an axis of periodicity, and wherein a first set of periodic diffractive features of the first out-coupling diffractive optic along a first axis of periodicity is emphasized over a second set of periodic diffractive features of the first out-coupling diffractive optic.

In further embodiments, a first set of periodic features of the second out-coupling diffractive optic along a second axis of periodicity is emphasized over a second set of periodic diffractive features of the second out-coupling diffractive optic.

In additional embodiments, the first and second out-coupling diffractive optics each define grating vectors, and wherein at least one of the grating vectors of the first out-coupling diffractive optic is de-emphasized over the other grating vectors of the first out-coupling diffractive optic, and wherein at least one of the grating vectors of the second out-coupling diffractive optic is de-emphasized over the other grating vectors of the second out-coupling diffractive optic.

In certain exemplary embodiments, the first and second portions of the image-bearing light beams can interact with the first and second out-coupling diffractive optics on the half-bounce.

The second plurality of periodic diffractive structures of the second in-coupling diffractive optic can be oriented approximately 90 degrees relative to the first plurality of periodic diffractive structures of the first in-coupling diffractive optic. In another embodiment, the first and second in-coupling diffractive optics can each further be represented by input grating vectors, wherein the input grating vectors of the first in-coupling diffractive optic are within 5 degrees of orthogonal with the input grating vectors of the second in-coupling diffractive optic. In some embodiments, the first in-coupling diffractive optic is coaxial with the second in-coupling diffractive optic. Further, in some embodiments, the first in-coupling diffractive optic has a pitch that is different from the second in-coupling diffractive optic.

The first image-bearing light beams can be a red image-bearing light beam having a wavelength in the range between 625 nm and 740 nm, and the second image-bearing light beam can be a blue image-bearing light beam having a wavelength in the range between 450 nm and 485 nm. The red image-bearing light beam can be in-coupled by the second in-coupling diffractive optic and diffracted at an extreme grazing angle, wherein the red image-bearing light beam does not propagate within the first image light guide by Total Internal Reflection ("TIR") when an angle of 90 degrees is reached. The blue image-bearing light beam can be in-coupled by the first in-coupling diffractive optic and diffracted at an angle that is less than the critical angle, wherein the blue image-bearing light beam does not propagate within the first image light guide by TIR.

The imaging light guide can be part of an imaging light guide system and further comprise a first image-bearing light beam source and a second image-bearing light beam source each producing an image in one of three primary color bands such that when combined, a multi-color virtual image is produced.

According to another aspect of the present invention, an imaging light guide for conveying a virtual image, comprises a first planar waveguide operable to propagate image-bearing light beams, the first planar waveguide having a first and second parallel surfaces, a first in-coupling diffractive optic formed along the first surface, the first in-coupling diffractive optic comprising a first plurality of periodic diffractive structures, wherein the first in-coupling diffractive optic is operable to diffract a first portion of the image-bearing light beams into the first planar waveguide in an angularly encoded form, and wherein the first in-coupling diffractive optic is operable to transmit a second portion of the image-bearing light beams, a first out-coupling diffractive optic formed along the waveguide, wherein the first out-coupling diffractive optic is operable to replicate the first portion and the second portion of the image-bearing light beams and direct the replicated image-bearing light beams from the waveguide in an angularly decoded form, a second in-coupling diffractive optic formed along the second surface, wherein the second in-coupling diffractive optic is operable to diffract a second portion of the image-bearing light beams into the first planar waveguide in an angularly encoded form, wherein the second in-coupling diffractive optic comprises a second plurality of periodic diffractive structures having a periodicity different from the first plurality of periodic diffractive structures of the first in-coupling diffractive optic, wherein the first in-coupling diffractive optic is substantially co-located with the second in-coupling diffractive optic, a first intermediate diffractive optic operable to direct the first portion of the image-bearing light beams to the first out-coupling optic and the second portion of the image-bearing light beams to the first out-coupling diffractive optic and located along the first planar surface, and wherein the first portion of the image-bearing light beams comprises a first wavelength range and the second portion of the image-bearing light beams comprises a second wavelength range.

According to yet another aspect of the present invention, an imaging light guide for conveying a virtual image comprises a first planar waveguide operable to propagate image-bearing light beams, the first planar waveguide having first and second parallel surfaces, a first in-coupling diffractive optic formed along the first surface, the first in-coupling diffractive optic comprising a first plurality of periodic diffractive structures, wherein the first in-coupling diffractive optic is operable to diffract a first portion of the image-bearing light beams into the first planar waveguide in an angularly encoded form, and wherein the first in-coupling diffractive optic is operable to transmit a second portion of the first set of image-bearing light beams, a first out-coupling diffractive optic formed along the waveguide, wherein the first out-coupling diffractive optic is operable to replicate the first portion of image-bearing light beams and direct the replicated first portion of image-bearing light beams from the waveguide in an angularly decoded form, a second in-coupling diffractive optic formed along the second surface, wherein the second in-coupling diffractive optic is operable to diffract a second portion of image-bearing light beams into the first planar waveguide in an angularly encoded form, wherein the second in-coupling diffractive optic comprises a second plurality of periodic diffractive structures having a periodicity different from the first plurality of periodic diffractive structures of the first in-coupling diffractive optic, and a second out-coupling diffractive optic in alignment with the first out-coupling diffractive optic on the second surface, wherein the second out-coupling diffractive optic is operable to replicate the second set of image-bearing light beams and direct the replicated second set of image-bearing light beams from the waveguide in an angularly decoded form.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION OF THE INVENTION

Figure 1B:
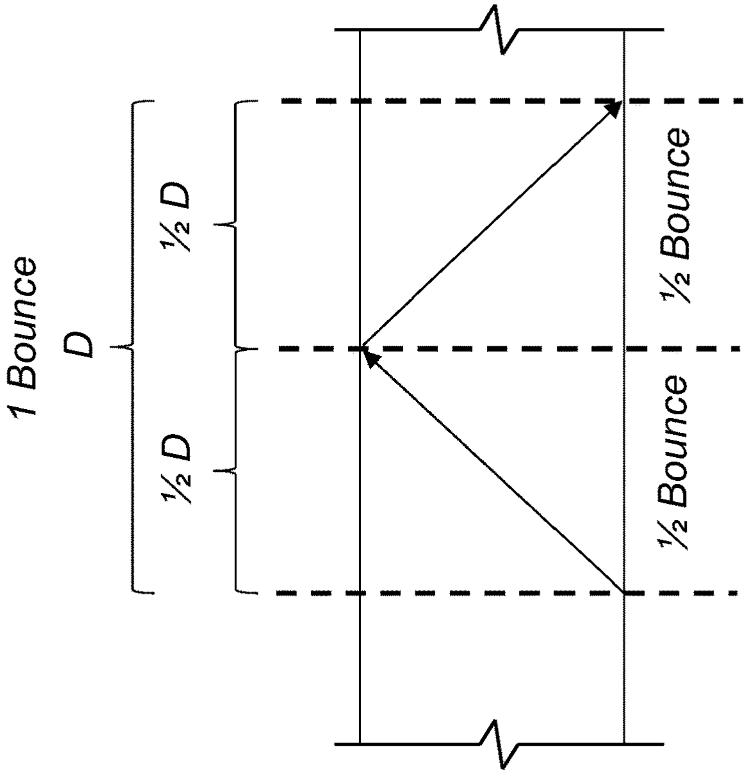
FIG. 1B is a schematic view of a portion of a planar waveguide showing a bounce and two half-bounces starting at a bottom surface of a planar waveguide according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

As used herein, the terms "first", "second", and so on, do not necessarily denote any ordinal, sequential, or priority relation, but are simply used to more clearly distinguish one element or set of elements from another, unless specified otherwise.

As used herein, the term "exemplary" is meant to denote "an example of", and is not intended to suggest any preferred or ideal embodiment.

As used herein, the terms "viewer", "wearer," "operator", "observer", and "user" are equivalent and refer to the person who wears and views images using an augmented reality system.

As used herein, the term "set" refers to a non-empty set, as the concept of a collection of elements or members of a set is widely understood in elementary mathematics. As used herein, the term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

As used herein, the terms "wavelength band" and "wavelength range" are equivalent and have their standard connotation as used by those skilled in the art of color imaging and refer to a continuous range of light wavelengths that are used to represent polychromatic images.

As used herein, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus as understood by those skilled in the art.

Figure 1A:
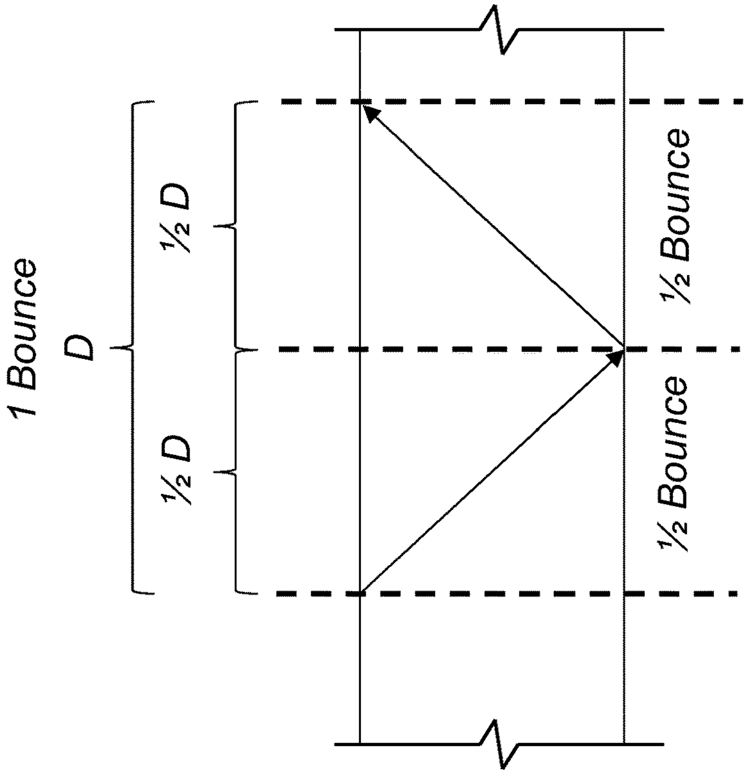
FIG. 1A is a schematic view of a portion of a planar waveguide showing a bounce and two half-bounces starting at a top surface of the planar waveguide according to an embodiment of the present disclosure.

As used herein, the term "bounce" is intended to mean that a ray, propagating through a planar waveguide by total internal reflection ("TIR"), starts at a first surface of the planar waveguide (for example, the top or bottom surface) and bounces (or reflects) off a second surface, opposite the first surface, toward the first surface, as shown in FIGS. 1A and 1B. A bounce has a distance "D" as shown in FIGS. 1A and 1B. The term "half-bounce" is intended to mean one-half of a bounce and has a distance of ½ D.

As used herein, the term "eyebox expansion" is intended to mean replication of a beam via multiple encounters with an optical element to provide exit pupil expansion in one or more directions.

A HMD is operable to form a virtual color image that can be visually superimposed over the real-world image that lies in the field of view of the HMD user. Optically transparent parallel plate waveguides, also called planar waveguides, convey image-bearing light generated by a color projector system to the HMD user. The planar waveguides convey the image-bearing light in a narrow space to direct the virtual image to the HMD user's pupil and enable the superposition of the virtual image over the real-world image that lies in the field of view of the HMD user.

In imaging light guides, collimated, relatively angularly encoded light beams from a color image source are coupled into an optically transparent image light guide assembly by an in-coupling optic, such as an in-coupling diffractive optic, which can be mounted or formed on a surface of the parallel plate planar waveguide or disposed within the waveguide. Such diffractive optics can be formed as, but are not limited to, diffraction gratings or holographic optical elements. For example, the diffraction gratings can be formed as surface relief gratings. After propagating along the planar waveguide, the diffracted color image-bearing light can be directed back out of the planar waveguide by a similar output grating, which may be arranged to provide pupil expansion along one or more directions. In addition, one or more intermediate diffractive optics, such as diffractive turning gratings, may be positioned along the waveguide optically between the input and output optics to provide pupil expansion in one or more directions.

The collimated angularly encoded image-bearing light beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The in-coupling optic couples the image-bearing light from an image source into the substrate of the planar waveguide. Any real image or image dimension is first converted into an array of overlapping angularly related beams encoding the different positions within an image for presentation to the in-coupling optic. At least a portion of the image-bearing light is diffracted and thereby redirected by the in-coupling optic into the waveguide as angularly encoded image-bearing light for further propagation along the waveguide by TIR. Although diffracted into a generally more condensed range of angularly related image-bearing light beams in keeping with the boundaries set by TIR, the image-bearing light preserves the image information in an encoded form. The out-coupling optic receives the encoded image-bearing light and diffracts at least a portion of the image-bearing light out of the waveguide as angularly encoded image-bearing light toward the eyebox. Generally, the out-coupling optic is designed symmetrically with respect to the in-coupling optic to restore the original angular relationships of the image-bearing light among outputted angularly related beams of the image-bearing light. However, to increase one dimension of overlap among the angularly related image-bearing light beams in the eyebox, the out-coupling optic is arranged to encounter the image-bearing light beams multiple times and to diffract only a portion of the image-bearing light beams on each encounter. The multiple encounters along the length of the out-coupling optic in the direction of propagation have the effect of expanding one direction of the eyebox within which the image-bearing light beams overlap. The expanded eyebox decreases sensitivity to the position of a viewer's eye for viewing the virtual image.

Out-coupling diffractive optics with refractive index variations along a single direction can expand one direction of the eyebox in their direction of propagation along the waveguide by multiple encounters of the image-bearing light beams with the out-coupling diffractive optic. In addition, out-coupling diffractive optics with refractive index variations along a second direction can expand a second direction of the eyebox and provide two-directional expansion of the eyebox. The refractive index variations along a first direction of the out-coupling diffractive optic can be arranged to diffract a portion of each beam's energy out of the waveguide upon each encounter therewith through a desired first order of diffraction, while another portion of the beam's energy is preserved for further propagation in its original direction through a zero order of diffraction. The refractive index variations along a second direction of the out-coupling diffractive optic can be arranged to diffract a portion of each beam's energy upon each encounter therewith through a desired first order of diffraction in a direction angled relative to the beam's original direction of propagation, while another portion of the beam's energy is preserved for further propagation in its original direction through a zero order of diffraction.

In contrast to methods for forming a real image, a virtual image is not formed on a display surface. That is, if a display surface were positioned at the perceived location of a virtual image, no image would be formed on that surface. A virtual image has a number of inherent advantages for augmented reality presentation. For example, the apparent size of a virtual image is not limited by the size or location of a display surface. Additionally, the source object for a virtual image may be small: for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

The imaging light guide optics form the virtual image having the appearance of a real object that is positioned a distance away and within the field of view of the observer. As is well known to those skilled in the imaging arts, the virtual image is synthetically simulated by divergence of light rays provided to the eye from an optical system. This optical effect forms a "virtual image" that is made to appear as if at a given position and distance in the field of view of the observer: there is no corresponding "real" object in the field of view from which the rays actually diverge. The capability for forming a virtual image that can be combined with real-world image content in the viewer's field of view distinguishes augmented reality imaging devices from other virtual image devices that do not allow a simultaneous view of the real world.

A generally planar optical waveguide is a physical structure that may be used to convey image bearing optical light from one region of the waveguide to other regions of the waveguide. Applications for such image conveying waveguides include head mounted monocular or binocular display systems.

Figure 2A:
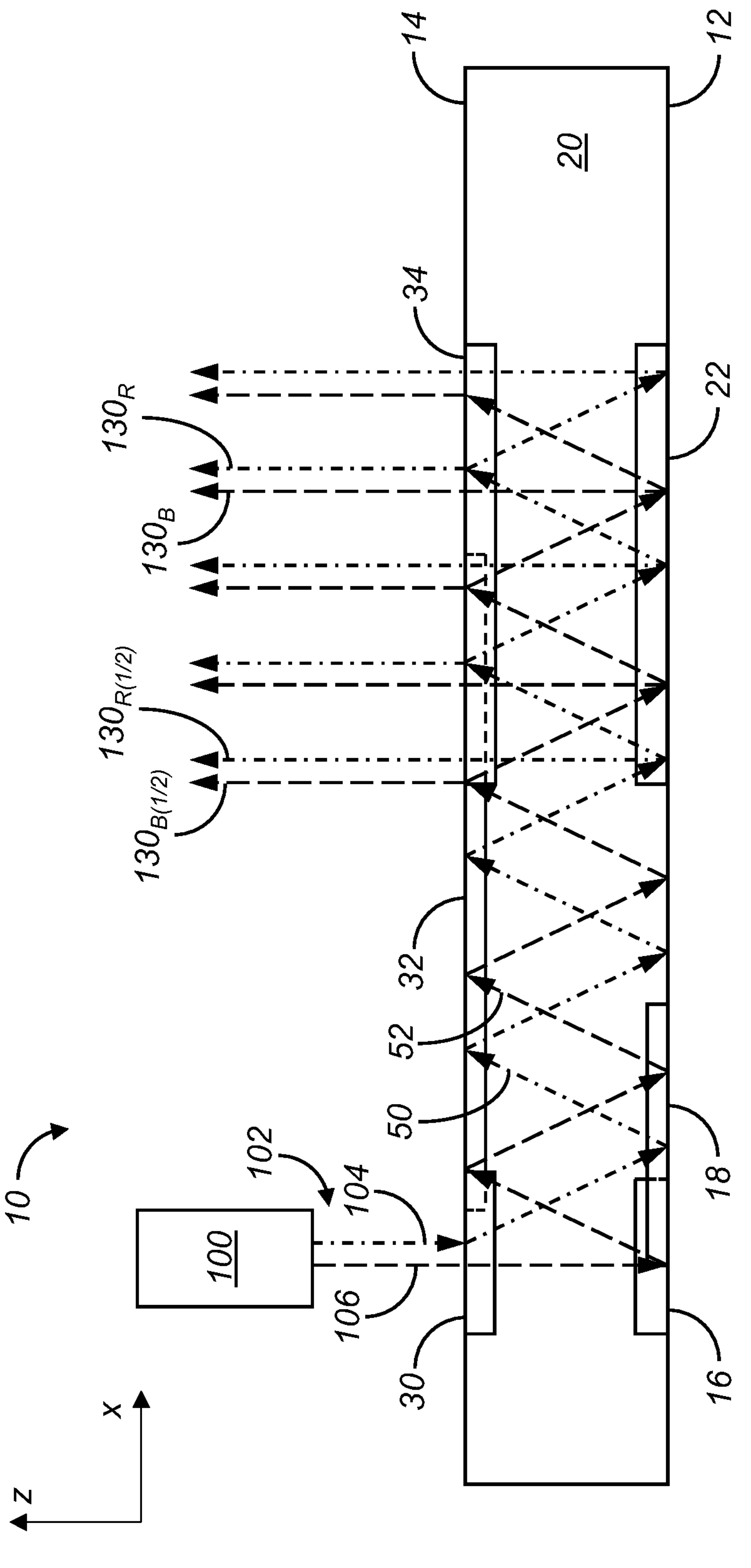
FIG. 2A is a side view of a double-sided waveguide according to an embodiment of the present disclosure.
Figure 2B:
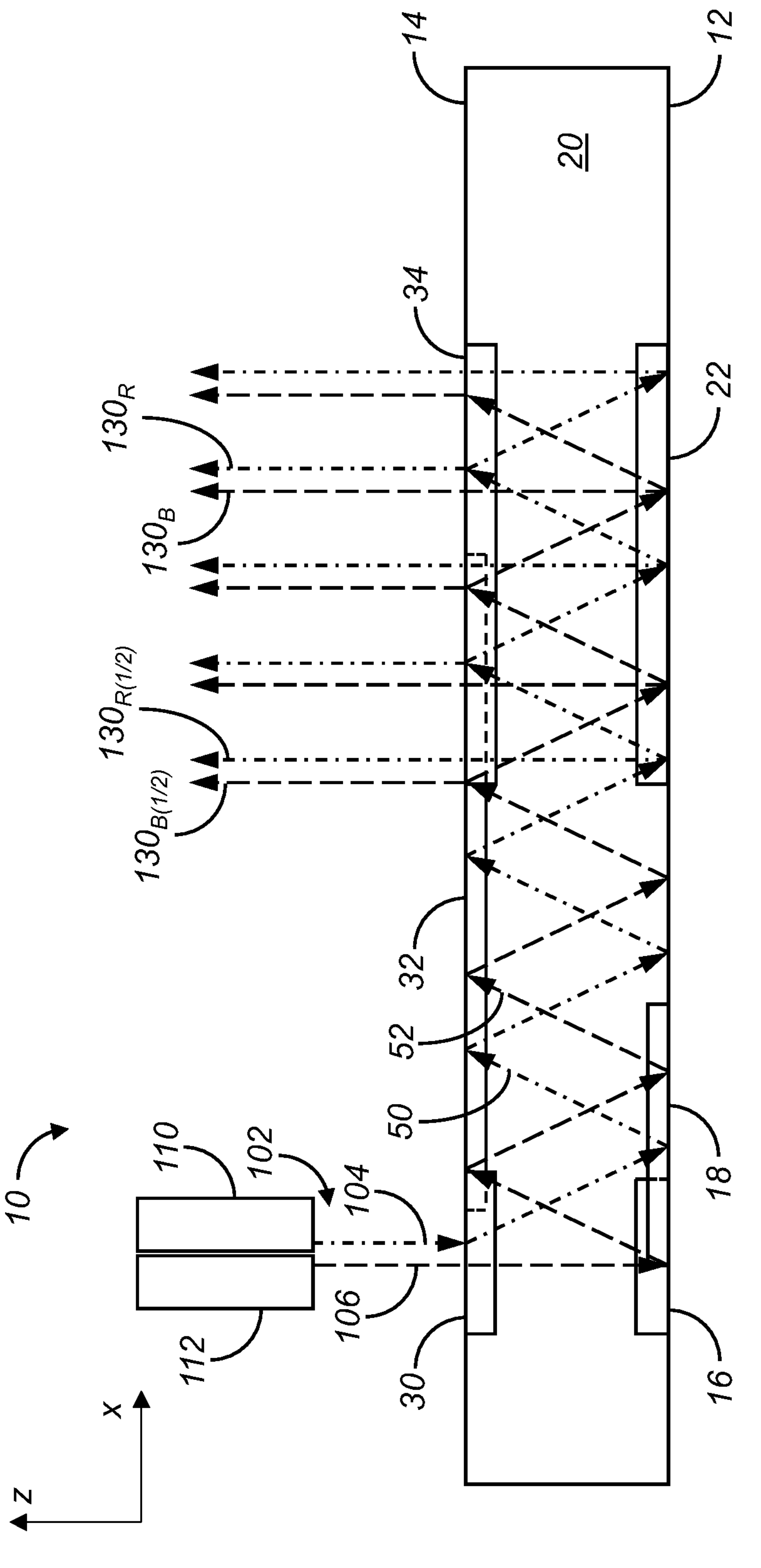
FIG. 2B is a side view of a double-sided waveguide having multiple image beam sources according to an embodiment of the present disclosure.

As illustrated in FIGS. 2A and 2B, in an embodiment, an image light guide assembly 10 includes a first planar waveguide 20. The first planar waveguide 20 has parallel bottom planar surface 12 and top planar surface 14. The first planar waveguide 20 includes an in-coupling diffractive optic 16 located on the bottom planar surface 12. In an embodiment, the in-coupling diffractive optic 16 is a surface relief diffraction grating. In another embodiment, the in-coupling diffractive optic 16 is a hologram diffraction element. In yet an embodiment, the in-coupling diffractive optic 16 is a reflection-type diffractive grating element. The first planar waveguide 20 may also include an intermediate diffractive optic 18 oriented to diffract a portion of the image-bearing light input by the in-coupling diffractive optic 16 in a reflective mode toward an out-coupling diffractive optic 22. The intermediate diffractive optic 18 may be referred to herein as a turning grating. In an embodiment, the turning grating 18 is a diffraction grating. In another embodiment, the turning grating 18 is a hologram diffraction element. The turning grating 18 is operable to expand the exit pupil via multiple encounters of the image-bearing light beams traveling within the first planar waveguide 20 in one or more directions (providing pupil expansion in one or more directions). The out-coupling diffractive optic 22 is operable to diffract a portion of the image-bearing light beams propagating within the first planar waveguide 20 out of the first planar waveguide 20. In an embodiment, the out-coupling diffractive optic 22 is a diffraction grating. In another embodiment, the out-coupling diffractive optic 22 is a hologram diffraction element. In an embodiment, the out-coupling diffractive optic 22 includes a repeating pattern of three overlapped linear periodic diffractive features. The three patterns may be represented by at least three primary grating vectors. In an embodiment of the out-coupling diffractive optic 22 where there are two overlapped patterns of periodic diffractive features, the third grating vector is implicitly present, but reduced in magnitude as described in more detail below. The out-coupling diffractive optic 22 may be arranged to provide pupil expansion in one or more directions. For example, refractive index variations along a single direction can expand one direction of the eyebox by multiple encounters of the individual angularly related beams in their direction of propagation along the first planar waveguide 20 with the out-coupling diffractive optic 22.

In FIGS. 2A and 2B, the in-coupling diffractive optics 16, 30 and the out-coupling diffractive optics 22, 34 are shown with a greater depth of diffractive feature profile than the intermediate diffractive optics 18, 32 to increase the clarity of the drawings: however, the in-coupling diffractive optics 16, 30, the out-coupling diffractive optics 22, 34, and the intermediate diffractive optics 18, 32 may have the same depth or any combination of depths unless otherwise provided herein.

With continued reference to FIGS. 2A and 2B, in an embodiment, the first planar waveguide 20 further includes an in-coupling diffractive optic 30 located on the top planar surface 14. In an embodiment, the in-coupling diffractive optic 30 is a surface relief diffraction grating. In another embodiment, the in-coupling diffractive optic 30 is a hologram diffraction element. The first planar waveguide 20 may also include an intermediate diffractive optic 32 oriented to diffract a portion of the image-bearing light input by the in-coupling diffractive optic 30 in a reflective mode toward an out-coupling diffractive optic 34.

The intermediate diffractive optic 32 may be referred to herein as a turning grating. In an embodiment, the turning grating 32 is a diffraction grating. In another embodiment, the turning grating 32 is a hologram diffraction element. The turning grating 32 is operable to provide pupil expansion in one or more directions. The out-coupling diffractive optic 34 is operable to diffract a portion of the image-bearing light beams propagating within the first planar waveguide 20 out of the first planar waveguide 20. In an embodiment, the out-coupling diffractive optic 34 is a diffraction grating. In another embodiment, the out-coupling diffractive optic 34 is a hologram diffraction element. In an embodiment, the out-coupling diffractive optic 34 includes a repeating pattern of three overlapped linear periodic diffractive features. The three patterns may be represented by at least three primary grating vectors. In an embodiment of the out-coupling diffractive optic 34 where there are two overlapped patterns of periodic diffractive features, the third grating vector is implicitly present, but reduced in magnitude as described in more detail below. The out-coupling diffractive optic 34 is arranged to encounter image-bearing light beams multiple times to provide pupil expansion in one or more directions. For example, refractive index variations along a single direction can expand one direction of the eyebox in the direction of propagation along the first planar waveguide 20 because of repeating encounters with the out-coupling diffractive optic 34.

As shown in FIG. 2A, the image light guide assembly 10 further includes an image source 100 that produces image-bearing light beams 102. In an embodiment, the image source 100 is a pico-projector. For example, the image source 100 may be a pico-projector that produces two or more primary color bands 104, 106 (e.g., red, green, or blue) of the image-bearing light beams comprising an image to be presented to a viewer looking generally along the z-axis direction through the image light guide assembly 10. In another embodiment, as shown in FIG. 2B, the image light guide assembly 10 includes a plurality of image sources 110, 112, each producing image-bearing light beams 102. For example, the image sources 110, 112, may each be a pico-projector, each producing a single primary color band 104, 106 (e.g., red, green, or blue) of image-bearing light. The three primary color bands in one embodiment are a green band having a wavelength in the range between 500 nm and 565 nm, a red band having a wavelength in the range between 625 nm and 740 nm, and a blue band having a wavelength in the range between 450 nm and 485 nm. In an embodiment, the image source 100 generates image-bearing light beams 104 in the red color band and image-bearing light beams 106 in the blue color band. In another embodiment, the image source 100 generates image-bearing light beams 104 in the red color band and image-bearing light beams 106 in the green color band. In an embodiment, the image source 110 generates image-bearing light beams 104 in the red color band and the image source 112 generates image-bearing light beams 106 in the blue color band. In another embodiment, the image source 112 generates image-bearing light beams 106 in the green color band.

In an embodiment, the image source 100 or image beam sources 110, 112 are positioned such that a central ray of the projected image bearing light beams 102 is generally perpendicular to the planar waveguide 20 top surface 14. The image source 100, or image sources 110, 112 may also be positioned such that the projected image-bearing light beams 102 central ray is not perpendicular to the planar waveguide 20 top or bottom surface 14, 12. It should be appreciated that FIGS. 2A and 2B do not illustrate every element that may be included in the image light guide assembly 10. For example, the image light guide assembly 10 may include prisms, to orient the projected light within the eyewear, and/or filters, such as polarization filters, among other features.

As illustrated in FIGS. 2A and 2B, in an embodiment, the image-bearing light beams 102 pass to the in-coupling diffractive optic 30 of the top surface 14 of waveguide 20 where a first portion of the image-bearing light beams 102 is diffracted into the first planar waveguide 20 as in-coupled image-bearing light beams 50. A second portion of the image-bearing light beams 102 passes through to the in-coupling diffractive optic 16 of the bottom surface 12 of the waveguide 20, which is diffracted into the first planar waveguide 20 as in-coupled image-bearing light beams 52. The in-coupled image-bearing light beams 50, 52 propagate through the first planar waveguide 20 by total internal reflection (TIR) between top planar surface 14 and bottom planar surface 12. In-coupled image-bearing light beams 50, 52 may be redirected by the turning grating 32, 18, respectively, and may be expanded in at least one direction. As discussed further below; in-coupled image-bearing light beams 50 may be expanded in at least one direction and may be directed out of the first planar waveguide 20 by the out-coupling diffractive optic 34 as out-coupled image-bearing light beams $130_R$. The in-coupled image-bearing light beams 52 may be expanded in at least one direction and may be directed out of the first planar waveguide 20 by the out-coupling diffractive optic 22 as out-coupled image-bearing light beams $130_B$.

FIGS. 3A-3D are views of the planar waveguide 20 where like numbers correspond to like elements of FIGS. 2A and 2B. FIGS. 3A-3D further show the in-coupling diffractive optics 16, 30 which are in alignment along the z-axis on surfaces 12, 14, respectively, and each of the diffraction grating features and associated grating vectors. With respect to FIG. 3D, this figure is an exploded view which visually separates the bottom and top surfaces of the waveguide 20; however, it is intended that there is only a single waveguide in this figure. Each surface of the planar waveguide 20 has the diffractive structures that serve at least one of three color bands. The grating vectors, generally designated k and shown with subscripts where they are specific to sets of diffractive features within an optic.

Figure 3A:
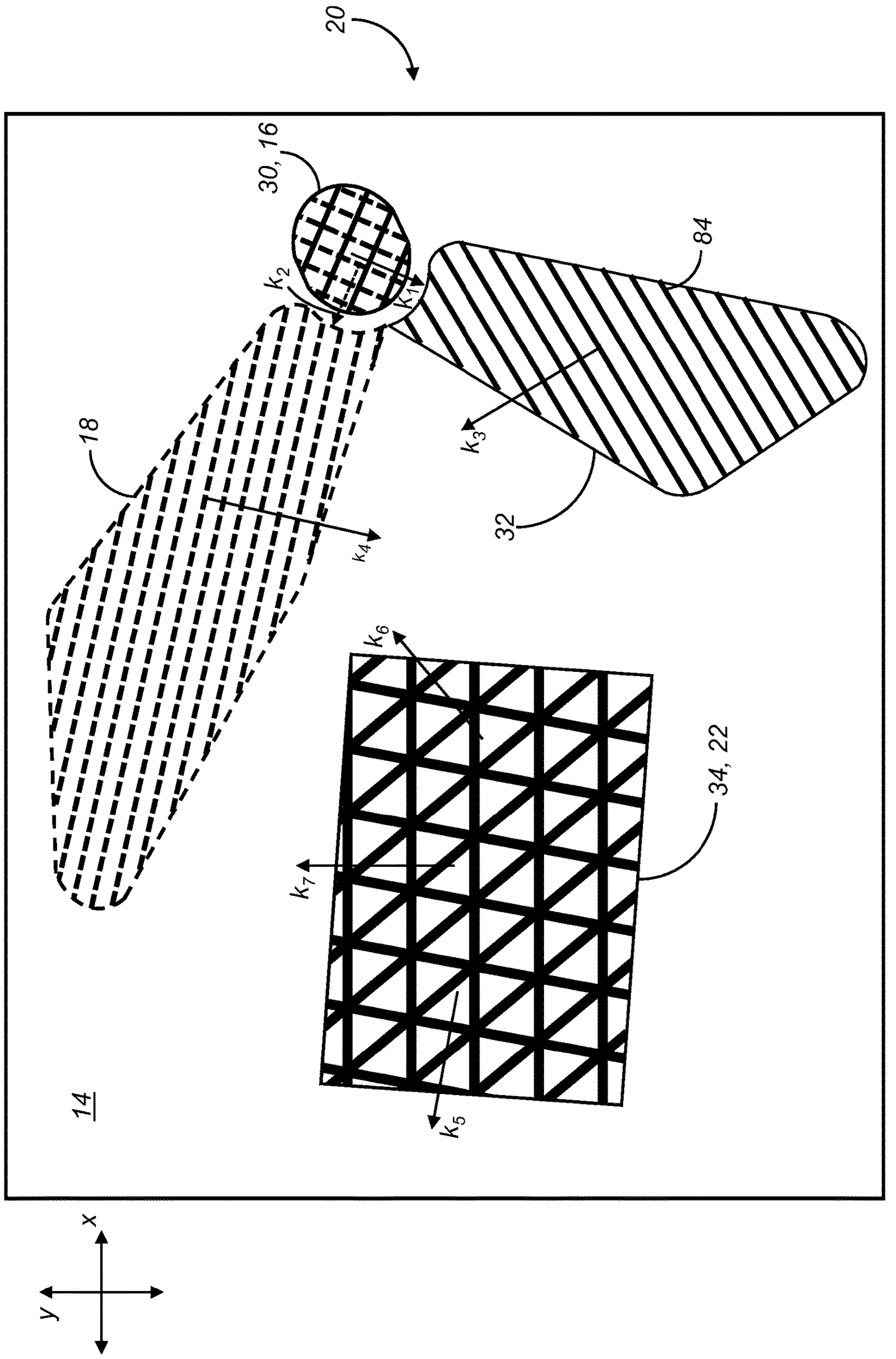
FIG. 3A is a perspective view that of a double-sided waveguide having one or more overlapping diffractive optical elements according to an embodiment of the present disclosure.
Figure 3B:
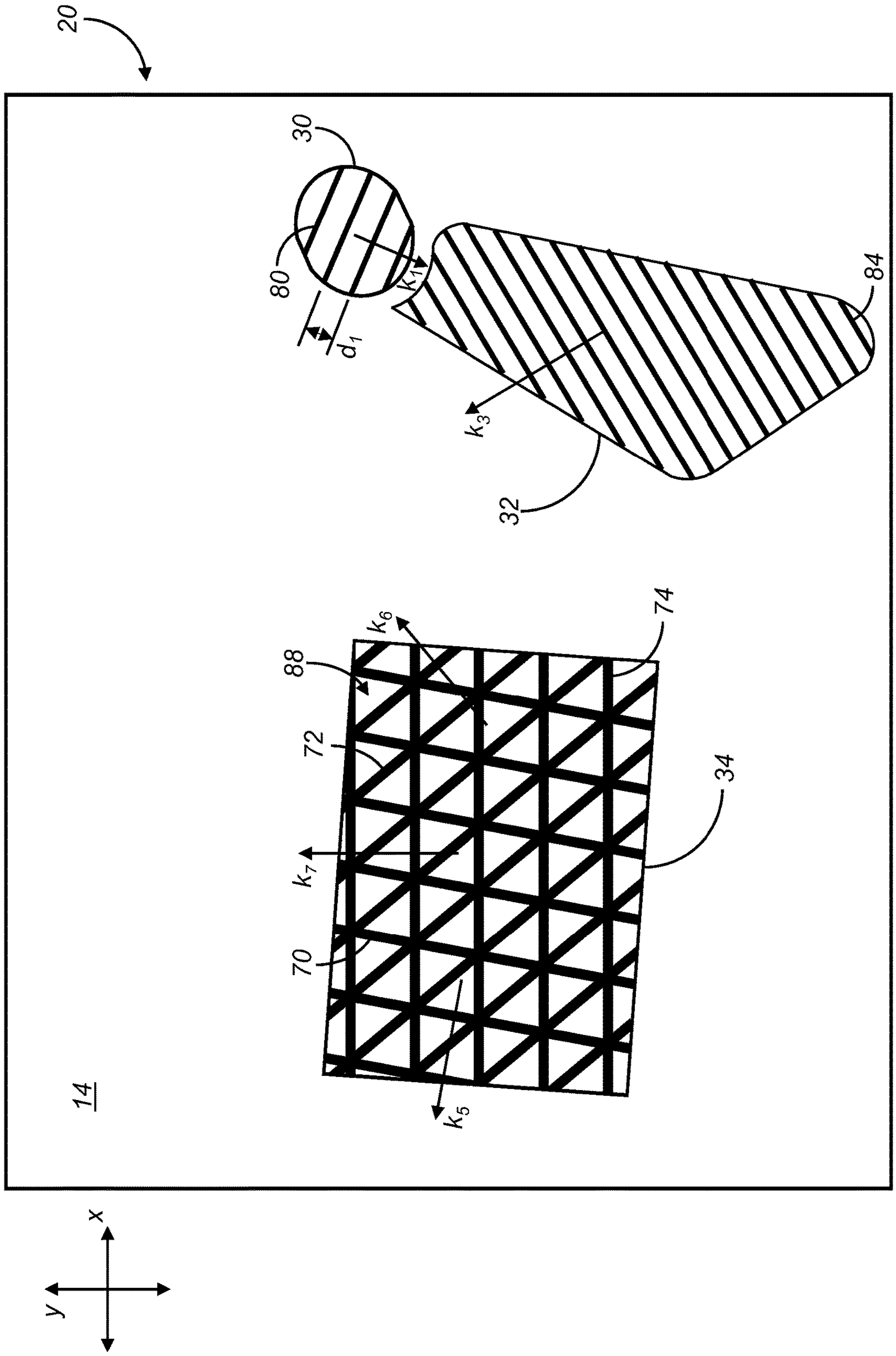
FIG. 3B is a top view of the double-sided waveguide of FIG. 3A.
Figure 3C:
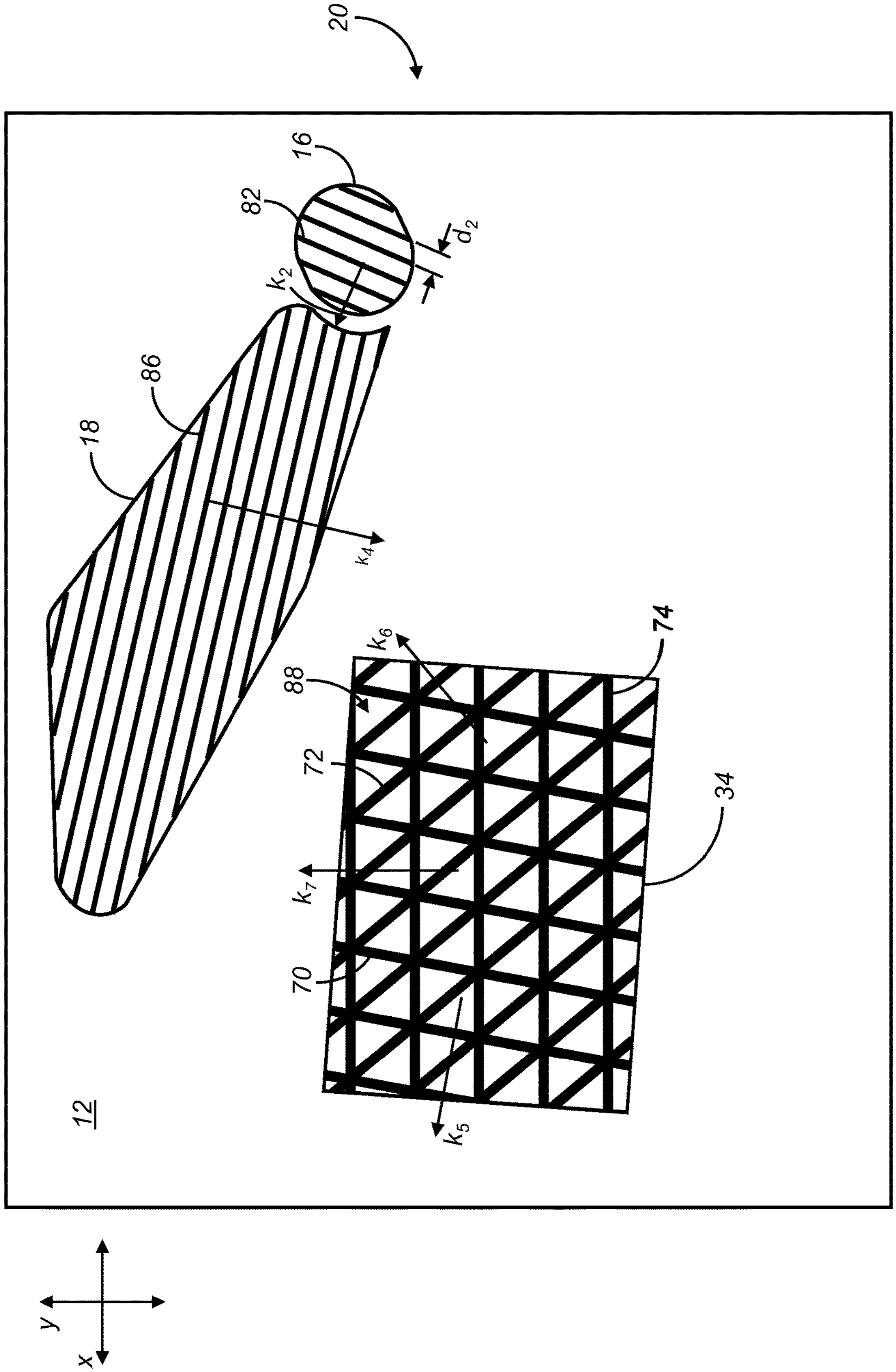
FIG. 3C is a bottom view of the double-sided waveguide of FIG. 3A.

As shown in FIGS. 3B and 3C, the in-coupling optical element 30 on surface 14 has diffractive features 80 and grating vector k1, and the in-coupling diffractive optic 16 on surface 12 has diffractive features 82 and grating vector k2. In one embodiment, the grating vectors k1 and k2 of the in-coupling optical elements 30, 16, respectively, are within five degrees (5) of orthogonal from each other. The in-coupling optical element 30 may have a period or pitch ($d_1$) that is different from the period or pitch ($d_2$) of the in-coupling optical element 16. Further, in an embodiment, the angle between the grating vectors k1, k2 of the in-coupling diffractive optics 16, 30 is ninety-degrees (90). In another configuration, the angle between the grating vectors k1, k2 of the in-coupling diffractive optics 16, 30 is approximately ninety-degrees (90). Planar waveguide 20 may further include intermediate diffractive optic 32 having diffractive features 84 and grating vector k3 and intermediate diffractive optic 18 having diffractive features 86 and grating vector k4. Further, planar waveguide 20 may include out-coupling diffractive optics 34, 22 each having diffractive features 88 and grating vectors k5, k6, k7.

Grating vectors, such as the depicted grating vectors k1, k2, k3, k4, k5, k6 and k7 extend in a direction that is normal to the diffractive features (e.g., grooves, lines, or rulings) of the diffractive optics and have a magnitude inverse to the period or pitch d (i.e., the on-center distance between the diffractive features) of the diffractive optics. In one embodiment, combinations of grating vectors ±k1, ±k3, ±k5 form a triangle when placed tip to tail. In an embodiment, combinations of grating vectors ±k2, ±k4, ±k6 form a triangle when placed tip to tail. In one embodiment, said triangle is an equilateral triangle. In one embodiment, said triangle is an isosceles triangle. In one embodiment said triangle is a scalene triangle.

Figure 3D:
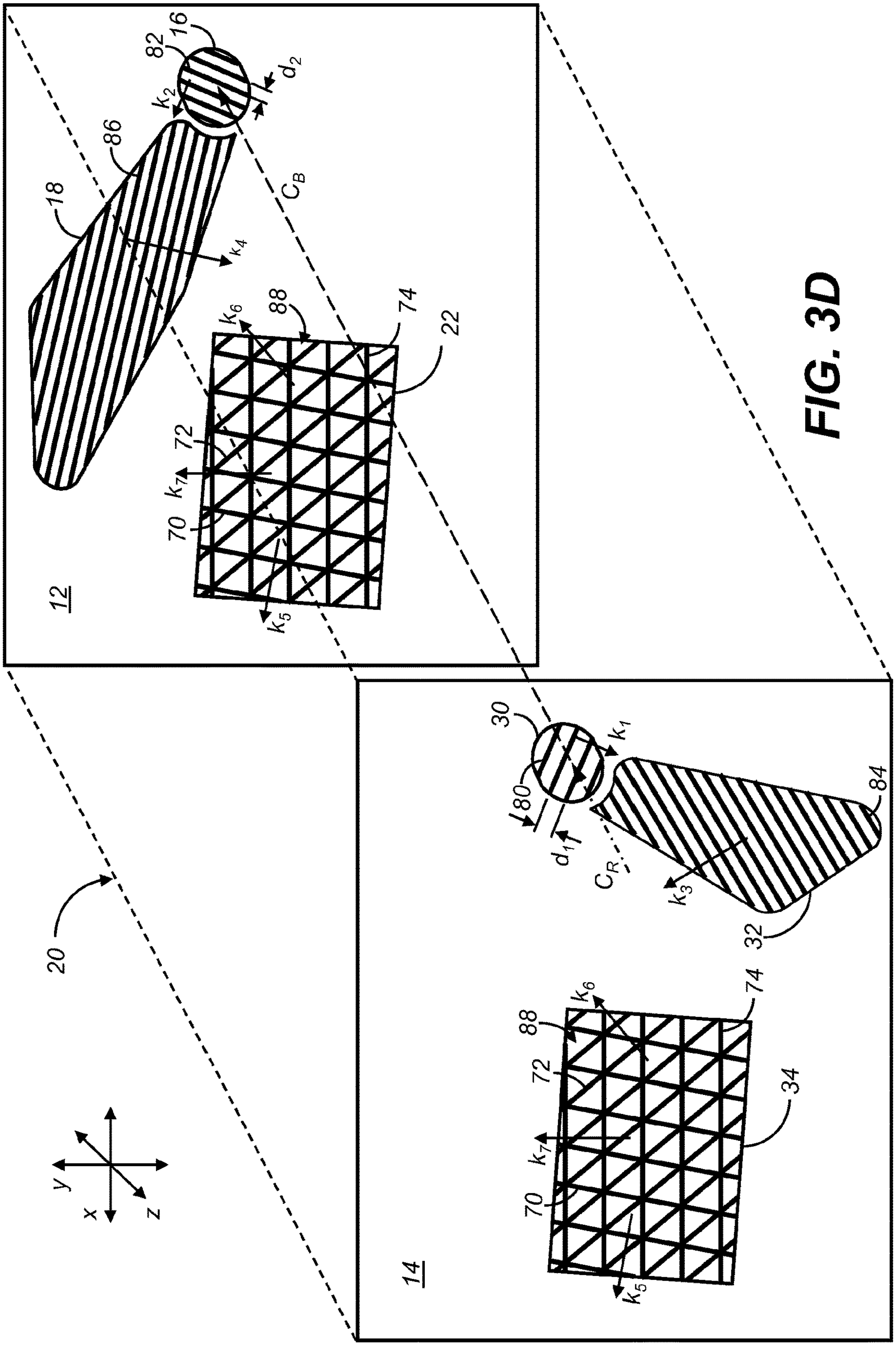
FIG. 3D is an exploded view of the double-sided waveguide of FIG. 3A showing the distribution of diffractive optical elements for two wavelength range light paths according to an embodiment of the present disclosure.
Figure 3E:
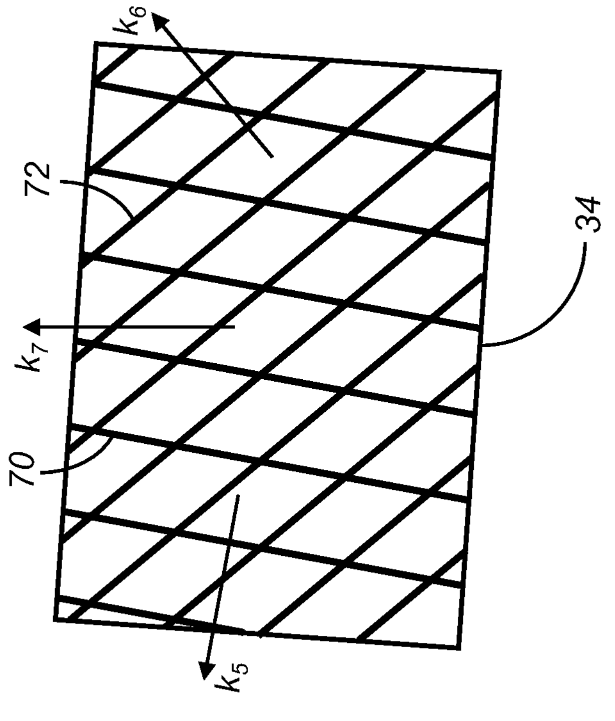
FIG. 3E is a schematic view of an out-coupling diffractive optic according to an embodiment of the present disclosure.

As shown in FIGS. 3A-3D, planar waveguide 20 may include out-coupling diffractive optics 34, 22 each having diffractive features 88 and grating vectors k5, k6, k7. In an embodiment, the diffractive features 88 may include two or three sets of linear diffractive features. In one embodiment, each out-coupling diffractive optic 34, 22 includes a first set of linear diffractive features 70, a second set of linear diffractive features 72, and a third set of linear diffractive features 74, each set 70, 72, and 74 having a different grating vector k5, k6, k7. For example, as shown in FIGS. 3A-3D, the first set of periodic diffractive features 70 can be oriented along a first axis of periodicity, the second set of periodic diffractive features 72 can be oriented along a second axis of periodicity, and the third set of periodic diffractive features 74 can be oriented along a third axis of periodicity. In one embodiment, in-coupling diffractive optic 16 and turning grating 18 have the same pitch ($d_2$) and in-coupling diffractive optic 30 and turning grating 32 have the same pitch ($d_1$). In an embodiment, diffractive features 70 have the same pitch as in-coupling diffractive optic 30 and diffractive features 72 have the same pitch as in-coupling diffractive optic 16 and turning grating 18. In an embodiment, diffractive features 70 of the out-coupling diffractive optic 34, 22 are emphasized more than the diffractive features 72 of the out-coupling diffractive optic 34, 22. For example, the diffractive features 70 may have a greater depth than the diffractive features 72, thereby increasing the diffractive efficiency of the diffractive features 70 relative to the diffractive features 72. Further, in an embodiment, diffractive features 72 of the out-coupling diffractive optic 34, 22 are emphasized more than diffractive features 70 of the out-coupling diffractive optic 34, 22. For example, the diffractive features 72 may have a greater depth than the diffractive features 70, thereby increasing the diffractive efficiency of the diffractive features 72 relative to the diffractive features 70. In an embodiment, the out-coupling diffractive optics 22, 34 each comprise grating vectors k5, k6, k7, and at least one of the grating vectors of out-coupling diffractive optic 22, 34 is de-emphasized over the other grating vectors of the out-coupling diffractive optic 22, 34. For example, as illustrated in FIG. 3E, where the out-coupling diffractive optic 22, 34 includes the first and second patterns of diffractive features 70, 72 having the grating vectors k5, k6, respectively, a third pattern of diffractive features 74 is inherent, the third pattern of diffractive features 74 having a third grating vector k7. In this example, the third grating vector k7 is reduced in magnitude relative to the grating vectors k5, k6.

In one embodiment, the in-coupling diffractive optics 16, 30 are co-located. That is, in one embodiment, the in-coupling diffractive optics 16, 30 are co-axially aligned or approximately aligned along the z-axis direction.

Figure 4:
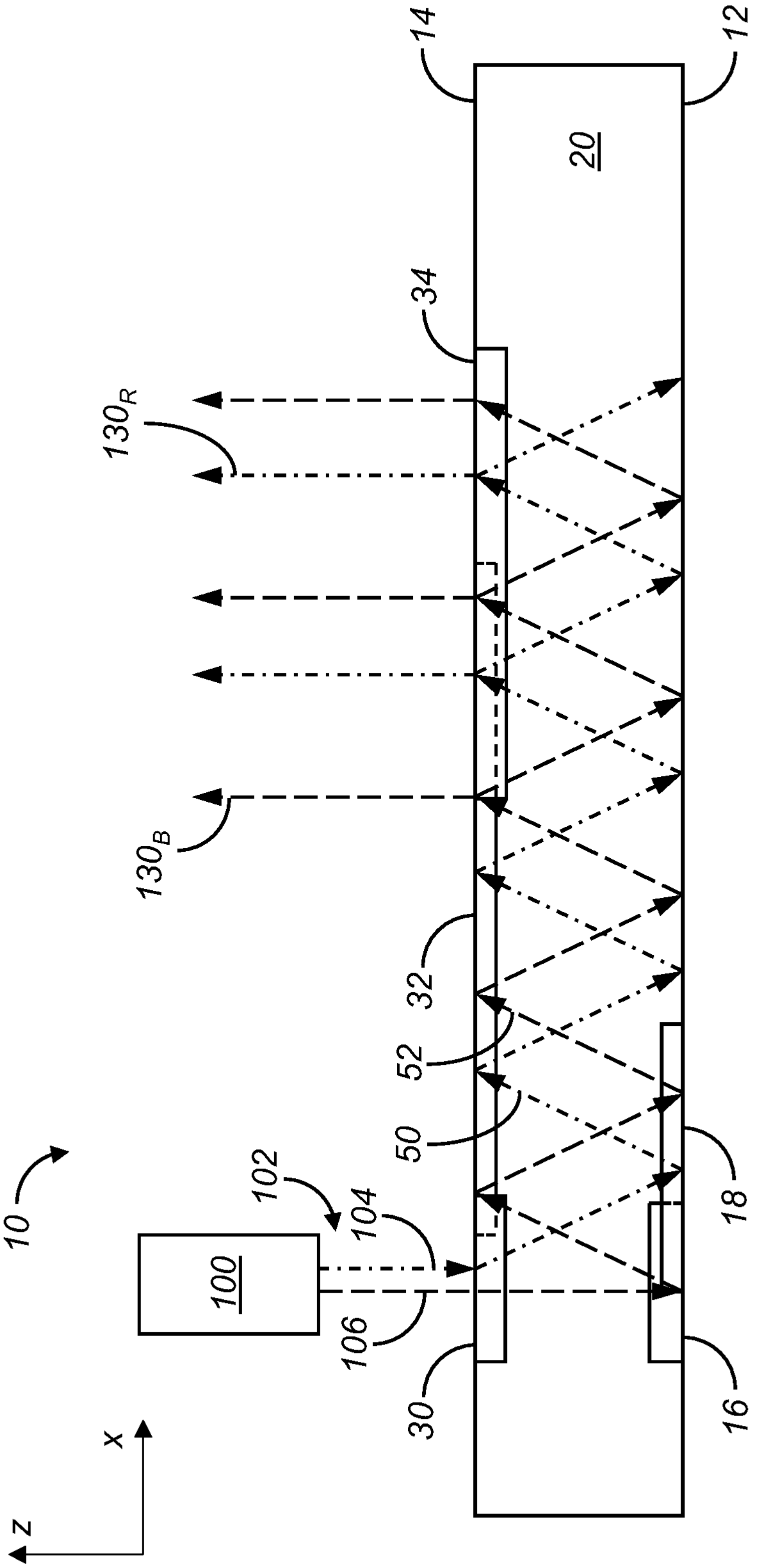
FIG. 4 is a side view of a double-sided waveguide having one out-coupling diffractive optic according to an embodiment of the present disclosure.

In an embodiment, the out-coupling diffractive optics 22, 34 have the same diffractive features, including the same pitch and orientation. In another embodiment, the planar waveguide 20 includes only one out-coupling diffractive optic as shown in FIG. 4. For example, the planar waveguide 20 may include either out-coupling diffractive optic 22, 34. In embodiments including only one out-coupling diffractive optic 22, 34, two-dimensional eyebox expansion via the out-coupling diffractive optic 22, 34 is possible. Refractive index variations along at least two directions can expand a second direction of the eyebox and provide two-directional expansion of the eyebox. The refractive index variations along a first direction of the out-coupling diffractive optic can be arranged to diffract a portion of each beam's energy out of the waveguide upon each encounter therewith through a desired first order of diffraction, while another portion of the beam's energy is preserved for further propagation in its original direction through a zero order of diffraction. The refractive index variations along a second direction of the out-coupling diffractive optic can be arranged to diffract a portion of each beam's energy upon each encounter therewith through a desired first order of diffraction in a direction angled relative to the beam's original direction of propagation, while another portion of the beam's energy is preserved for further propagation in its original direction through a zero order of diffraction.

In any of the embodiments described herein, the out-coupling diffractive features 88 can be formed as a two-dimensional structures having at least two different grating vectors k5, k6. In an embodiment, the out-coupling diffractive features 88 have at least three primary grating vectors k5, k6, k7. In one embodiment, the two-dimensional structures 88 comprise blazed gratings. In another embodiment, the two-dimensional structures 88 are described by a generally triangular shape.

Turning again to FIGS. 2A, 2B, and 3A-3D, in an embodiment, each surface of the planar waveguide 20 has diffractive structures that serve at least one of three wavelengths (or color bands). Thus, components on the bottom 12 are primarily for one or two wavelengths/optical paths while components shown on the top 14 are primarily for a wavelength/optical path different from the wavelengths/optical paths on the bottom 12. However, each of the out-coupling diffractive optics 22, 34 operates in each of the optical paths of the waveguide 20. For example, in FIG. 3D, one wavelength range light path $C_B$ is provided for blue light (from about 450-485 nm): a second wavelength range light path $C_R$ is provided for red light (from about 610-780 nm). Wavelength range light path $C_B$ has diffractive elements 16 and 22 and turning grating 18 formed on the rear surface 12 of the planar waveguide 20. Wavelength range light path $C_R$ includes in-coupling diffractive optic 30, intermediate diffractive optic 32, and out-coupling diffractive optic 34 arranged along the top surface 14 of the waveguide 20 and out-coupling diffractive optic 22 arranged along the bottom surface 12 of the waveguide 20. In an embodiment, the in-coupling diffractive optics 16 and 30 align with each other along a common imaginary axis normal to the parallel bottom and top surfaces 12, 14. Similarly, the out-coupling diffractive optics 22 and 34 also align along a common imaginary axis normal to the parallel top and bottom surfaces 12, 14. The respective turning gratings 18, 32 are not similarly aligned. It should be appreciated that any of a number of arrangements of wavelength range light paths and their associated bandwidth ranges can be used. As shown in FIGS. 2A and 2B, in one embodiment, the image-bearing light beams 102 pass to the in-coupling diffractive optic 30 of the top surface 14 of waveguide 20 where a first portion of the image-bearing light beams 102 of a first wavelength range is diffracted into the first planar waveguide 20 as in-coupled image-bearing light beams 50. In one embodiment, the first wavelength range is the red color band. A second portion of the image-bearing light beams 102 can include a second wavelength range passing through to the in-coupling diffractive optic 16 of the bottom surface 12 of the waveguide 20, which is diffracted into the first planar waveguide 20 as in-coupled image-bearing light beams 52. In one embodiment, the second wavelength range is the blue color band.

In an embodiment, the second portion of the image-bearing light beams 102 may further include a third wavelength range passing through a second planar waveguide (not shown) having a third in-coupling diffractive optic. In one embodiment, the third wavelength range is in the green color band. The in-coupled image-bearing light beams 50, 52 propagate through the first planar waveguide 20 by total internal reflection (TIR) between top planar surface 14 and bottom planar surface 12. In-coupled image-bearing light beams 50, 52 may be redirected by the turning grating 32, 18, respectively, and may be expanded in at least one direction. In-coupled image-bearing light beams 50 may be expanded in at least one direction and may be directed out of the first planar waveguide 20 by the out-coupling diffractive optic 34 as out-coupled image-bearing light beams $\mathbf{130}_R$. The in-coupling bearing light beams 52 may be expanded in at least one direction and may be directed out of the first planar waveguide 20 by the out-coupling diffractive optic 22 as out-coupled image-bearing light beams $\mathbf{130}_B$.

Typically, in the event image-bearing light beams 104 within, for example, the red wavelength range, in-couple via the in-coupling diffractive optic 16 arranged for in-coupling the image-bearing light beams 106 within, for example, the blue wavelength range, the image-bearing light beams 104 in-coupled as image-bearing light beams 50 will be at an extreme grazing angle and will not propagate through the first planar waveguide 20 by TIR. In an embodiment, the diffractive features 80 of in-coupling diffractive optic 30 have a pitch that is courser than the pitch of the diffractive features of the in-coupling diffractive optic 16 wherein the image-bearing light beams 52 do not diffract at an angle that is greater than the critical angle, which interferes with the image-bearing light beams 52 from propagating through the first planar waveguide by TIR.

Crosstalk between wavelength range light paths may be problematic with many types of imaging system, including arrangements using multiple stacked waveguides, but is a particular concern for designs using a single waveguide including a double-sided waveguide. One approach for reducing crosstalk is to separate the optical paths within the light guide as much as is possible, both in terms of angle and of distance. Thus, as shown in FIG. 3D, the path of the image-bearing light in the wavelength range light path $C_R$ is separated from the path of the image-bearing light in the wavelength range light path $C_B$ by both angle and distance, so that "leakage" of light to the wrong color path does not occur or is negligible. Thus, as shown in FIGS. 3B-3C, the plurality of periodic diffractive structures 82 of in-coupling diffractive optic 16 are positioned generally ninety-degrees (90) relative to the plurality of periodic diffractive structures 80 of the in-coupling diffractive optic 30.

While it is necessary to reduce crosstalk at the in-coupling diffractive optics 16, 30, surprisingly this crosstalk can be made advantageous for improving the image-bearing light 130 output intensity and uniformity across the entire output aperture. As shown in FIGS. 2A and 2B, the image-bearing light beams 50, 52 interact with the out-coupling diffractive optics 22, 34 on the "half-bounce". For example, image-bearing light-beams 50 interact with the out-coupling diffractive optic 22 on the half-bounce and are out-coupled as image-bearing light beams $\mathbf{130}_{R(1/2)}$, increasing the frequency and uniformity of the out-coupled image-bearing light beams $\mathbf{130}_R$, $\mathbf{130}_{R(1/2)}$. Further, image-bearing light beams 52 interact with the out-coupling diffractive optic 34 on the half-bounce and are out-coupled as image-bearing light beams $\mathbf{130}_{B(1/2)}$, increasing the frequency and uniformity of the out-coupled image bearing light beams $\mathbf{130}_B$, $\mathbf{130}_{B(1/2)}$.

In imaging light guide systems, different angular ranges of image-bearing light behave similarly to different wavelength ranges of image-bearing light. Different angular ranges of image-bearing light can be utilized to provide an increased field of view (i.e., a wide field of view) of a virtual image. For example, an imaging light guide utilizing two optical paths for image-bearing light in two wavelength ranges as described supra may have a full width half maximum (FWHM) at an angular range of +/−15 degrees. In contrast, an embodiment where the wavelength range is the same for both optical paths in the imaging light guide 10, the first optical path may be utilized to propagate light in an angular range of −30 to 0 degrees and the second optical path may be utilized to propagate light in an angular range of 0 to +30 degrees.

In an embodiment, rather than providing multiple wavelength range paths, the imaging light guide 10 is operable to provide multiple angular range paths. For example, the image source 100 may generate angularly related image-bearing light beams 104 in a left angular range (e.g., −30 to 0 degrees) and angularly related image-bearing light beams 106 in a right angular range (e.g., 0 to +30 degrees). Similarly, the image source 110 may generate angularly related image-bearing light beams 104 in the left angular range and the image source 112 may generate angularly related image-bearing light beams 106 in the right angular range. The imaging light guide 10 as described supra provides for reduced crosstalk via improved separation of angular range paths.

Figure 5:
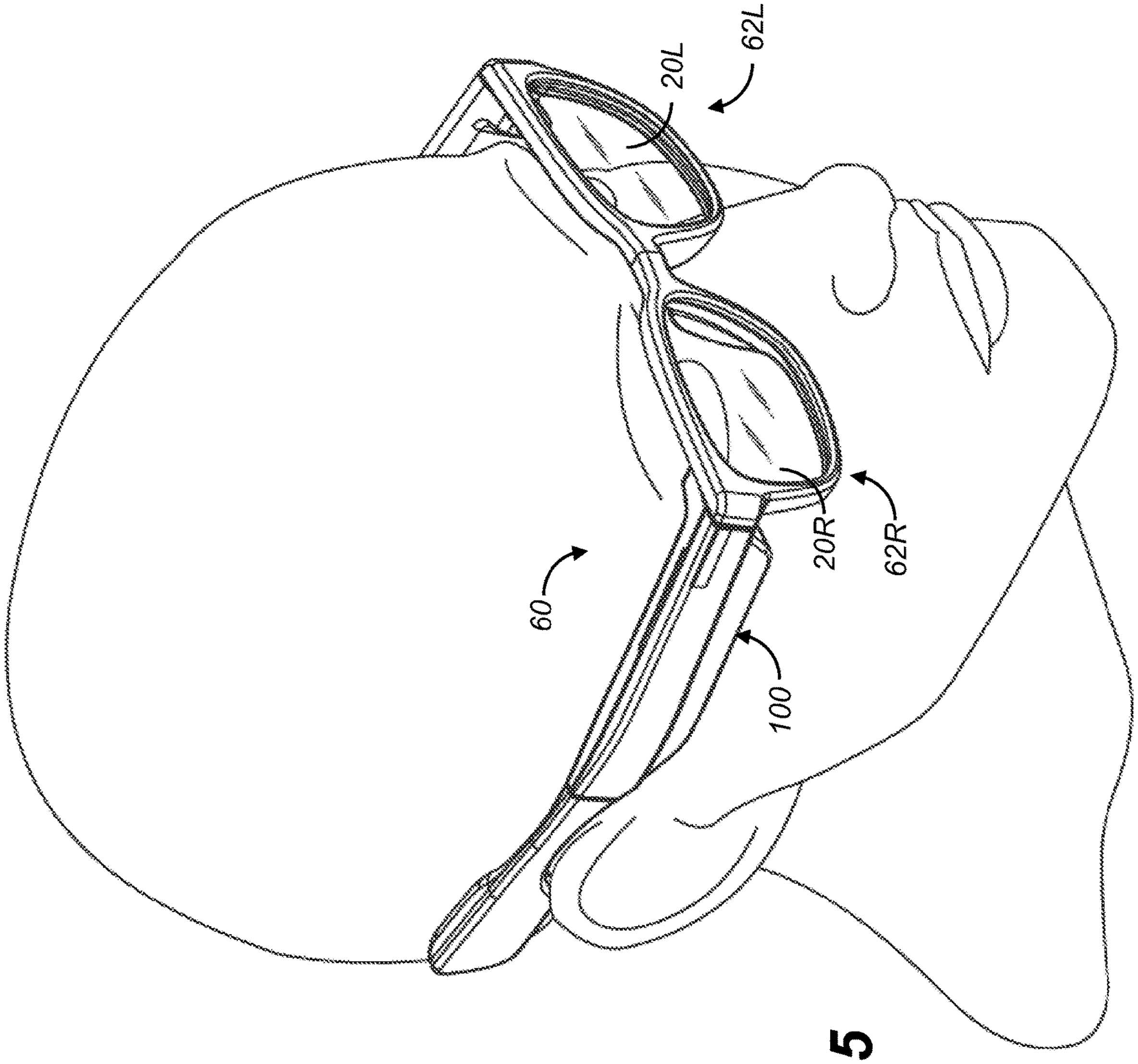
FIG. 5 is a perspective view that shows a display system for augmented reality viewing using imaging light guides according to an embodiment of the present disclosure.

The perspective view of FIG. 5 shows a display system 60 for three-dimensional (3-D) augmented reality viewing using imaging light guides of the present disclosure. Display system 60 is shown as an HMD with a left-eye optical system 62L having a waveguide 20L for the left eye and a corresponding right-eye optical system 62R having a waveguide 20R for the right eye. An image source 100, such as a picoprojector or similar device, can be provided, energizable to generate a separate image for each eye. The images that are generated can be a stereoscopic pair of images for 3-D viewing. The virtual image that is conveyed to the viewer by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. In an embodiment, separate projectors are included for each eye.

Figure 6:
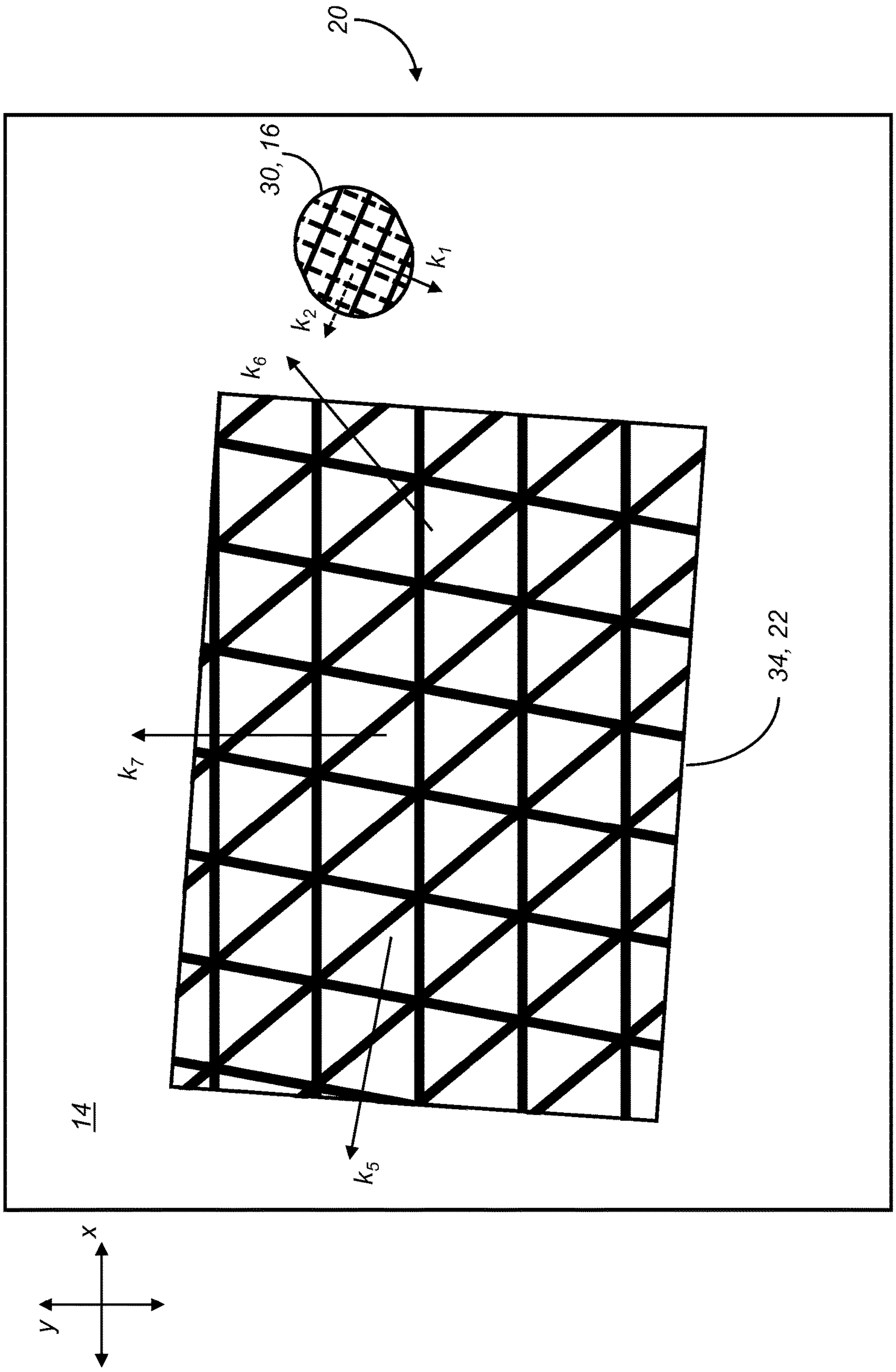
FIG. 6 is a perspective view of a double-sided waveguide having one or more overlapping diffractive optical elements according to an embodiment of the present disclosure.

Referring now to FIG. 6, in an embodiment, the waveguide 20 may be designed with the intermediate diffractive optics 18, 32. For example, the out-coupling diffractive optics 22, 34 may have an increased area to increase the rate of incidence of the image-bearing light beams propagating from the in-coupling diffractive optics 16, 30.

One or more features of the embodiments described herein may be combined to create additional embodiments which are not depicted. The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An imaging light guide for conveying a virtual image, comprising:

a waveguide having first and second parallel surfaces;

a first in-coupling diffractive optic arranged along said first surface, said first in-coupling diffractive optic comprising a first plurality of periodic diffractive structures, wherein said first in-coupling diffractive optic is operable to diffract a first portion of image-bearing light beams into said waveguide in an angularly encoded form, and wherein said first in-coupling diffractive optic is operable to transmit a second portion of image-bearing light beams;

a second in-coupling diffractive optic arranged along said second surface, said second in-coupling diffractive optic comprising a second plurality of periodic diffractive structures having a periodicity different from said first plurality of periodic diffractive structures, wherein said second in-coupling diffractive optic is operable to diffract said second portion of image-bearing light beams into said waveguide in an angularly encoded form;

wherein said first in-coupling diffractive optic is arranged substantially coaxial with said second in-coupling diffractive optic along a first imaginary axis normal to said first surface;

a first out-coupling diffractive optic arranged along said first surface, wherein said first out-coupling diffractive optic is operable to direct said first and second portions of image-bearing light beams from said waveguide in an angularly decoded form toward an eyebox, wherein first said out-coupling diffractive optic defines at least two grating vectors; and a second out-coupling diffractive optic arranged along said second surface opposite said first out-coupling diffractive optic, wherein said second out-coupling diffractive optic is arranged substantially coaxial with said first out-coupling diffractive optic along a second imaginary axis normal to said first surface, and wherein said second out-coupling diffractive optic is operable to direct said first and second portions of image-bearing light beams from said waveguide in an angularly decoded form toward the eyebox, wherein said second out-coupling diffractive optic defines said at least two grating vectors, wherein at least a portion of said first and second portion of said image-bearing light beams is out-coupled on a half-bounce interaction with said first and second out-coupling diffractive optics.

2. The imaging light guide of claim 1, wherein said first portion of said image-bearing light beams comprises a first wavelength range and said second portion of said image-bearing light beams comprises a second wavelength range.

3. The imaging light guide of claim 1, wherein said first portion of image-bearing light beams comprises a first range of angularly related beams and said second portion of image-bearing light beams comprises a second range of angularly related beams that differs from said first range of angularly related beams, wherein said first and second portions of image-bearing light beams form a wide field of view image.

4. The imaging light guide of claim 1, further comprising a first intermediate diffractive optic arranged along said first surface and operable to direct said first portion of said image-bearing light beams to said first or second out-coupling diffractive optic; and a second intermediate diffractive optic arranged along said second surface and operable to direct said second portion of said image-bearing light beams to said first or second out-coupling diffractive optic.

5. The imaging light guide of claim 1, wherein periodic diffractive features of said first out-coupling diffractive optic are the same as said periodic diffractive features of said second out-coupling diffractive optic.

6. The imaging light guide of claim 5, wherein each periodic diffractive feature of a first set of periodic diffractive features of said first out-coupling diffractive optic has a greater depth than each periodic diffractive feature of a second set of periodic diffractive features of said first out-coupling diffractive optic.

7. The imaging light guide of claim 6, wherein each periodic diffractive feature of a first set of periodic features of said second out-coupling diffractive optic has a greater depth than each periodic diffractive feature of a second set of periodic diffractive features of said second out-coupling diffractive optic.

8. The imaging light guide of claim 5, wherein said first and second out-coupling diffractive optics each have a plurality of grating vectors, and wherein one of said grating vectors of each of said first and second out-coupling diffractive optics has a magnitude less than said other grating vectors.

9. The imaging light guide of claim 1, wherein said first and second out-coupling diffractive optics comprise two-dimensional periodic diffractive features operable to expand said first portion and said second portion of said image-bearing light beams and direct said expanded image-bearing light beams from said waveguide.

10. The imaging light guide of claim 1, wherein said second plurality of periodic diffractive structures of said second in-coupling diffractive optic is oriented approximately ninety degrees relative to said first plurality of periodic diffractive structures of said first in-coupling diffractive optic.

11. The imaging light guide of claim 1, wherein said first and second in-coupling diffractive optics are each further represented by input grating vectors, and wherein said input grating vectors of said first in-coupling diffractive optic are within 5 degrees of orthogonal with said input grating vectors of said second in-coupling diffractive optic.

12. The imaging light guide of claim 1, wherein said first in-coupling diffractive optic has a pitch that is different from said second in-coupling diffractive optic.

13. The imaging light guide of claim 1, wherein said imaging light guide is part of a virtual reality imaging system or an augmented reality imaging system.

14. The imaging light guide of claim 1, wherein said imaging light guide is part of an imaging light guide system comprising a first image-bearing light beam source and a second image-bearing light beam source each producing an image in one of three primary color bands such that when combined, a multi-color virtual image is produced.

15. An imaging light guide for conveying a virtual image, comprising:

a waveguide operable to propagate image-bearing light beams, said waveguide having a first and second parallel surfaces;

a first in-coupling diffractive optic formed along said first surface, said first in-coupling diffractive optic comprising a first plurality of periodic diffractive structures, wherein said first in-coupling diffractive optic is operable to diffract a first portion of said image-bearing light beams into said first planar waveguide in an angularly encoded form, and wherein said first in-coupling diffractive optic is operable to transmit a second portion of said image-bearing light beams;

a first out-coupling diffractive optic formed along said first surface, wherein said first out-coupling diffractive optic is operable to expand said first portion of said image-bearing light beams and direct said expanded image-bearing light beams from said waveguide in an angularly decoded form;

a second in-coupling diffractive optic formed along said second surface, wherein said second in-coupling diffractive optic is operable to diffract the second portion of said image-bearing light beams into said first planar waveguide in an angularly encoded form, wherein said second in-coupling diffractive optic comprises a second plurality of periodic diffractive structures having a periodicity different from said first plurality of periodic diffractive structures of said first in-coupling diffractive optic;

wherein said first in-coupling diffractive optic is substantially co-located with said second in-coupling diffractive optic;

a second out-coupling diffractive optic arranged along said second surface, wherein said second out-coupling diffractive optic is in alignment with said first out-coupling diffractive optic and configured to direct said first and second portions of image-bearing light beams from said waveguide in an angularly decoded form toward the eyebox, wherein said second out-coupling diffractive optic defines at least two grating vectors, wherein at least a portion of said first and second portion of said image-bearing light beams is out-coupled on a half-bounce interaction with said first and second out-coupling diffractive optics, and an intermediate diffractive optic operable to direct said first portion of said image-bearing light beams to said first or second out-coupling diffractive optic, wherein said intermediate diffractive optic is located along said first or second surface.

16. The imaging light guide of claim 15, wherein said first out-coupling diffractive optic comprises diffractive structures defining a first direction of periodicity and a second direction of periodicity, wherein said diffractive structures defining said first direction of periodicity have a periodicity substantially equal to a periodicity of said first plurality of periodic diffractive structures, and wherein said diffractive structures defining said second direction of periodicity have a periodicity substantially equal to said periodicity of said second plurality of periodic diffractive structures.

17. The imaging light guide of claim 15, wherein said intermediate diffractive optic is a first intermediate diffractive optic, and further comprising a second intermediate diffractive optic located along said first or second surface opposite said first intermediate diffractive optic, wherein said second intermediate diffractive optic is operable to direct said second portion of said image-bearing light beams to said first or second out-coupling diffractive optic.

18. An imaging light guide for conveying a virtual image, comprising:

a waveguide operable to propagate image-bearing light beams, said waveguide having a first and second parallel surfaces;

a first in-coupling diffractive optic formed along said first surface, said first in-coupling diffractive optic comprising a first plurality of periodic diffractive structures, wherein said first in-coupling diffractive optic is operable to diffract a first portion of said image-bearing light beams into said first planar waveguide in an angularly encoded form, and wherein said first in-coupling diffractive optic is operable to transmit a second portion of said first set of image-bearing light beams;

a first out-coupling diffractive optic formed along said first surface, wherein said first out-coupling diffractive optic is operable to replicate said first portion of image-bearing light beams and direct said replicated first portion of image-bearing light beams from said waveguide in an angularly decoded form;

a second in-coupling diffractive optic formed along said second surface, wherein said second in-coupling diffractive optic is operable to diffract a second portion of image-bearing light beams into said waveguide in an angularly encoded form, wherein said second in-coupling diffractive optic comprises a second plurality of periodic diffractive structures having a periodicity different from said first plurality of periodic diffractive structures of said first in-coupling diffractive optic; and a second out-coupling diffractive optic formed along said second surface and at least partially overlapping with said first out-coupling diffractive optic, wherein said second out-coupling diffractive optic is operable to replicate said second set of image-bearing light beams and direct said replicated second set of image-bearing light beams from said waveguide in an angularly decoded form, wherein said first and second out-coupling diffractive optics comprise two-dimensional periodic diffractive features, wherein said first and second portion of said image-bearing light beams interact with said first and second out-coupling diffractive optics on a half-bounce, wherein at least a portion of said first and second portion of said image-bearing light beams is out-coupled on said half-bounce interaction with said first and second out-coupling diffractive optics.

19. The imaging light guide of claim 1, wherein said first set of said image-bearing light beams comprises a first wavelength range and said second set of said image-bearing light beams comprises a second wavelength range different from said first wavelength range.

20. The imaging light guide of claim 18, wherein said first set of image-bearing light beams comprises a first range of angularly related beams and said second set of image-bearing light beams comprises a second range of angularly related beams that differs from said first range of angularly related beams.

* * * * *